(12) United States Patent
Crombez et al.

(10) Patent No.: US 6,709,075 B1
(45) Date of Patent: Mar. 23, 2004

(54) SYSTEM AND METHOD FOR BRAKING AN ELECTRIC DRIVE VEHICLE ON A LOW MU SURFACE

(75) Inventors: Dale Scott Crombez, Livonia, MI (US); Steven Otis Pate, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 09/635,183

(22) Filed: Aug. 7, 2000

(51) Int. Cl.$^7$ .............................................. B60T 13/74
(52) U.S. Cl. ........................................... 303/152; 303/3
(58) Field of Search .............................. 303/3, 15, 150, 303/152; 701/80, 81

(56) References Cited

U.S. PATENT DOCUMENTS

| | | | |
|---|---|---|---|
| 4,671,577 A | 6/1987 | Woods | 303/3 |
| 4,701,682 A | 10/1987 | Hirotsu et al. | 318/52 |
| 4,799,161 A | 1/1989 | Hirotsu et al. | 364/426.01 |
| 4,962,969 A | 10/1990 | Davis | 303/3 |
| 5,273,349 A * | 12/1993 | Kidston | 303/100 |
| 5,322,352 A | 6/1994 | Ohno et al. | 303/3 |
| 5,358,317 A | 10/1994 | Cikanek | 303/100 |
| 5,378,053 A | 1/1995 | Patient et al. | 303/3 |
| 5,423,600 A | 6/1995 | Riddiford et al. | 303/3 |
| 5,433,512 A | 7/1995 | Aoki et al. | 303/3 |
| 5,450,324 A * | 9/1995 | Cikanek | 364/426.02 |
| 5,476,310 A | 12/1995 | Ohtsu et al. | 303/3 |
| 5,492,192 A | 2/1996 | Brooks et al. | 180/165 |
| 5,511,859 A | 4/1996 | Kade et al. | 303/3 |
| 5,511,866 A * | 4/1996 | Terada et al. | 303/152 |
| 5,615,933 A | 4/1997 | Kidston et al. | 303/152 |
| 5,632,534 A | 5/1997 | Knechtges | 303/152 |
| 5,664,850 A | 9/1997 | Kuno et al. | 303/150 |
| 5,769,509 A | 6/1998 | Feigel et al. | 303/152 |
| 5,839,533 A | 11/1998 | Mikami et al. | 180/165 |
| 5,839,800 A | 11/1998 | Koga et al. | 303/152 |
| 5,857,755 A | 1/1999 | Aoki et al. | 303/152 |
| 6,231,134 B1 * | 5/2001 | Fukasawa et al. | 303/152 |

* cited by examiner

Primary Examiner—Jack Lavinder
Assistant Examiner—Bradley King
(74) Attorney, Agent, or Firm—Gregory Brown

(57) ABSTRACT

Strategies other than immediate elimination of regenerative braking (FIG. 2) are invoked when an incipient wheel lock-up is detected, the ABS becomes active, and/or incipient wheel slip is detected. The strategies include: reducing the regenerative braking torque as a function of the coefficient of friction of a surface on which the vehicle is traveling (FIG. 3); and adjusting regenerative braking in relation to the rate at which wheel slip is changing (FIG. 4). Some of the strategies may be applied on an individual wheel basis (FIG. 5), and some of the strategies may be applied in conjunction with operating friction brakes of the vehicle to apply at least some of the reduction in regenerative braking torque as friction brake torque (FIG. 1).

1 Claim, 5 Drawing Sheets

SYSTEM AND METHOD FOR BRAKING AN ELECTRIC DRIVE VEHICLE ON A LOW MU SURFACE

BACKGROUND OF THE INVENTION

1. Field of the Invention

This invention relates to braking systems of electric drive vehicles, and in particular to strategies for modifying regenerative braking that might otherwise potentially affect vehicle handling when the brake pedal is depressed while the vehicle is traveling on a low Mu surface and/or while an anti-lock brake system (ABS) is actively controlling the application of friction brakes at the vehicle wheels.

2. Background Information

The powertrain of an electric drive vehicle comprises a rotary electric machine whose operation may be under the control of a powertrain control module (PCM), a name that is sometimes given to an electronic module that processes certain data to control various aspects of powertrain operation. Sometimes the electric machine operates as a motor that makes a positive torque contribution to powertrain torque. At other times the electric machine operates as a generator that makes a negative torque contribution to powertrain torque. Positive torque contribution from the electric machine may appear as traction torque delivered through a drivetrain of the vehicle to at least some of the wheels to propel the vehicle. Negative torque contribution from the electric machine imposes braking torque on the drivetrain to brake the vehicle.

When an electric machine imposes braking torque on the drivetrain to brake the vehicle, it is operating as an electric generator. Generated electricity may be used advantageously to regenerate an on-board electric power supply such as a battery. Hence, such braking is commonly referred to as regenerative braking, or sometimes simply regen for short. A vehicle that possesses regenerative braking capability typically does not rely exclusively on such braking for the vehicle service brakes. While some energy recovery is made possible by regenerative braking, it is inappropriate at certain times to invoke regenerative braking. For example, the state of charge (SOC) of a battery, or battery bank, may be such that regenerative electric current from the electric machine should not be fed, either in whole or in part, to the battery or bank. In the absence of a suitable sink for such electric current, an alternate braking means is needed.

Therefore, an electric drive vehicle typically employs some form of mechanical service brakes, such as friction brakes at individual wheels. Mechanical friction brakes may be hydraulic-, pneumatic-, or electric-operated. It is known to use an electronic brake controller, or brake control unit (BCU), to apply relative proportions of regenerative braking and friction braking when braking is called for.

The braking system may include an anti-lock capability embodied in an anti-lock brake system (ABS) that is effective to sense incipient wheel lock-up and modulate the application of the friction brake in a way that seeks to avoid wheel lock-up and resulting skidding that could possibly lead to loss of vehicle control during certain braking events. Various types of anti-lock brake systems are presently in commercial use.

When a vehicle experiences a driving situation where incipient wheel lock up is detected, the driver has typically removed his or her foot from the accelerator pedal with or without having depressed the brake pedal. In an electric drive vehicle, the action of releasing the accelerator pedal may initiate regenerative braking that simulates the compression braking that would occur in the same situation in a vehicle whose powertrain comprises an internal combustion engine. This form of simulated braking may be referred to as compression regenerative braking, or CR braking for short. Regenerative braking that results from depressing the brake pedal is referred to as service brake regen, or SBR for short.

An electric drive vehicle may have multiple higher levels of CR braking in order to increase energy recovery during a braking event and simulate the compression braking that would be imposed on the powertrain by a combustion engine when an associated transmission is in a low gear. These higher levels of CR braking, along with additional SBR, may have an unintended effect on ABS operation, and so it has heretofore been proposed to eliminate regenerative (both CR and SBR) braking in an electric drive vehicle when its ABS becomes active. When the ABS detects incipient wheel lock-up, a signal is broadcast to the PCM, which in turn immediately reduces CR braking.

A preliminary novelty search developed the following U.S. Patents as evidencing the state of the art: U.S. Pat. Nos. 4,671,577; 4,701,682; 4,799,161; 4,962,969; 5,322,352; 5,358,317; 5,378,053; 5,423,600; 5,433,512; 5,450,324; 5,476,310; 5,492,192; 5,511,859; 5,615,933; 5,632,534; 5,664,850; 5,769,509; 5,839,533; 5,839,800; and 5,857,755.

SUMMARY OF THE INVENTION

It is believed that strategies other than immediate elimination of regenerative braking may be useful in an electric drive vehicle when an incipient wheel lock-up is detected, the ABS becomes active, and/or incipient wheel slip is detected. Such strategies are the subject of the present invention.

According to a first aspect, the present invention relates to a strategy in which torque that is being applied to the drivetrain as regenerative braking torque at the time a wheel-condition-initiated event occurs is applied as friction brake torque at wheel brakes instead of as regenerative torque. A wheel-condition-initiated event may be any one of incipient wheel lock-up, ABS becoming active, and wheel slip. Implementation of the strategy can be accomplished by an exchange of appropriate information between the PCM and the BCU. A slewing technique may be used to transition the torque shifting from regenerative braking to friction braking. When the wheel-condition-initiated event ceases, a decision is made whether or not to resume regenerative braking. This decision is made on the basis of additional vehicle operating conditions not necessarily related to the wheel conditions (e.g. traction torque request from the accelerator pedal).

According to a second aspect, the present invention relates to a strategy in which the torque that is being applied to the drivetrain as regenerative braking torque at the time of occurrence of one of the above-mentioned wheel-condition-initiated events is reduced to a predetermined level, but not completely eliminated. The level to which the regenerative brake torque is reduced may be the highest amount of regenerative brake torque that will not substantially impact vehicle stability, steerability, or intended effectiveness of the ABS when the wheel-condition-initiated event occurs under any surface condition because the ABS becomes active. This too can be accomplished by an exchange of appropriate information between the PCM and the BCU. The amount of regenerative brake torque that will not substantially impact vehicle stability, steerability, or intended effectiveness of the ABS can be obtained in any one or more of various ways, such as by mathematical modeling and calculation, or by testing a vehicle under the worse case surface conditions, typically ice, to determine what the maximum tolerable amount would be without affecting vehicle dynamics.

According to a third aspect, the present invention relates to a strategy in which the coefficient of friction of the surface on which the vehicle is traveling is estimated and the regenerative braking is reduced to a value appropriate to the estimate. Such a value is one that does not substantially change the handling characteristics of the vehicle. For example, the torque to which regenerative braking is reduced may be made progressively smaller as the value of the coefficient of friction of the underlying road surface (Mu) decreases. Estimation of the value of Mu may be made on-board the vehicle by known techniques or algorithms.

According to a fourth aspect, the present invention relates to a strategy in which the coefficient of friction of the surface on which the vehicle is traveling is repeatedly estimated during activation of the ABS, and regenerative braking is adjusted according to the magnitude of wheel slip. For example, greater regenerative braking may be allowed at smaller wheel slips and lesser regenerative braking at greater wheel slips, or the regenerative braking may be adjusted in relation to the rate at which wheel slip is changing.

According to a fifth aspect, the present invention relates to the strategies described in any of the second, third, and fourth aspects wherein adjustments are made on a wheel-by-wheel basis.

Further aspects will be seen in various features of a presently preferred embodiment of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

A representative torque controller for the powerplant of an electric drive vehicle includes a powertrain control module (PCM) and a brake control unit (BCU). It should be appreciated that the descriptive term control module, or control unit, is used in a generic sense, and not in a limiting sense, to designate an electronic unit that comprises an assembly that comprises various electronic components, including a processor, for processing various data inputs and delivering various data outputs to perform selected functions in the manner herein described. The vehicle powerplant comprises a rotary electric machine that can operate either as an electric motor for propelling the vehicle or as an electric generator for braking the vehicle. The vehicle also includes a service brake system for braking the vehicle via the application of friction brakes.

The friction brakes may be applied in any suitable way. For example, the driver may depress a brake pedal to actuate the brakes via electric-, hydraulic-, or pneumatic-actuation. A drivetrain from the electric motor to driven wheels includes a mechanism that is selectively operable by the driver to different gears. When placed in a gear other than Neutral or Park, the transmission enables the electric machine, operating as a motor, to propel the vehicle. For propelling the vehicle, there is an accelerator, or throttle, that is operated by the driver, typically by an accelerator pedal. When a driver who has been depressing the accelerator pedal to propel the vehicle releases the pedal, compression regenerative braking that simulates the compression braking that would occur in a vehicle powered by an internal combustion engine when the pedal is released, occurs. Compression regenerative braking is a function that is embodied in processing performed by the PCM and/or BCU.

When the brake pedal is depressed, braking torque may manifest itself as regenerative torque and/or friction brake torque. Regenerative torque resulting from depression of the brake pedal is sometimes referred to as service brake regen (SBR). The total regenerative torque that is produced is the combination of both compression regenerative (CR) braking and SBR and is referred to as regenerative braking.

Figure 1:
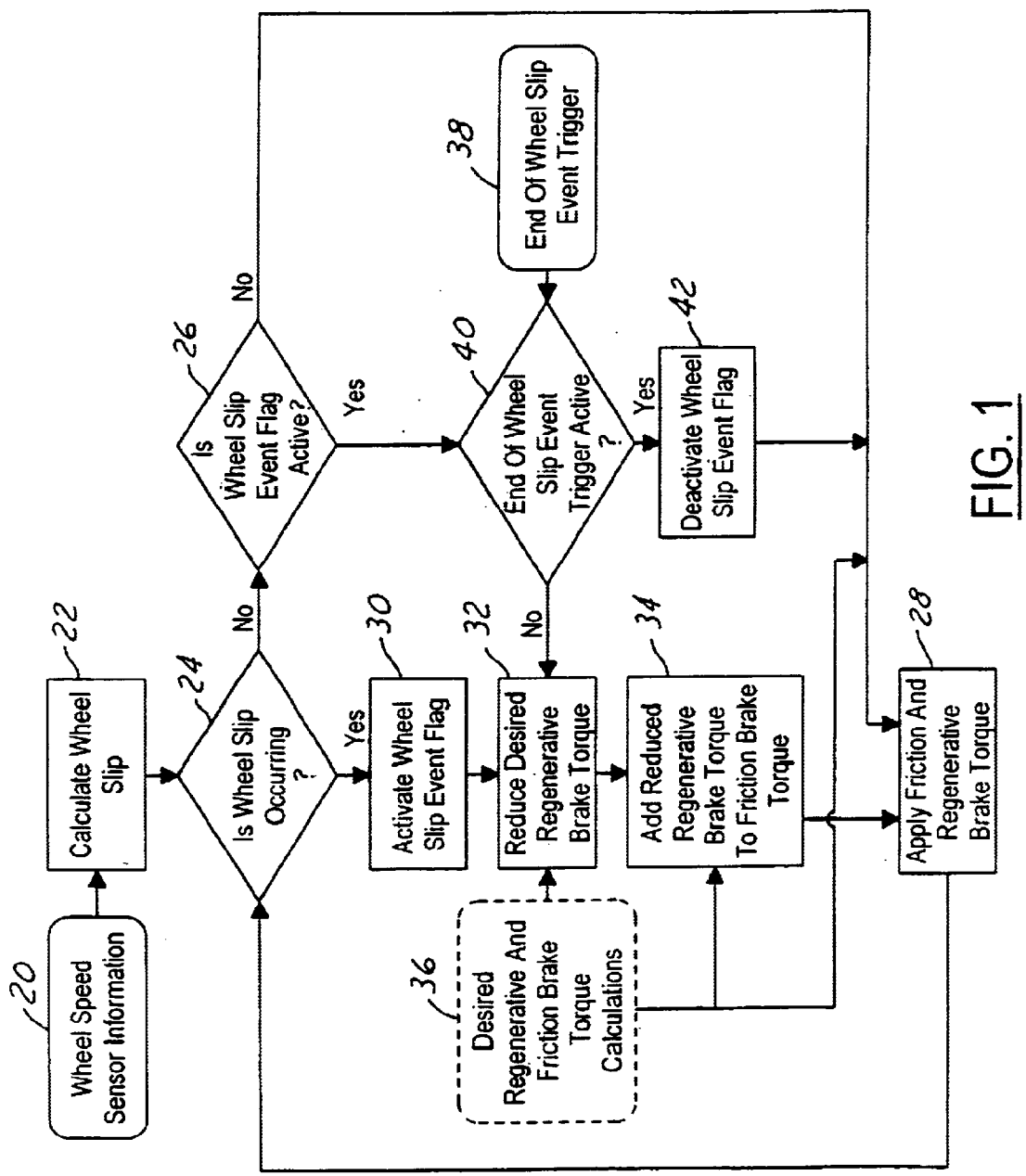
FIG. 1 is a flow diagram representing a first embodiment of control strategy, in accordance with principles of the present invention.

FIG. 1 shows a flow diagram of a strategy that is executed by the PCM and the BCU in association with an ABS that has its own processor. Communication of electronic data between various devices in the vehicle, including PCM, BCU, and ABS processors, occurs via a communication, or data, bus on which data is broadcast at suitable update rates. The ABS utilizes wheel speed sensor information 20 as a data input for calculating wheel slip (step 22). A certain amount of wheel slip indicative of an incipient wheel lock-up will activate the ABS (steps 24, 30).

A suitable algorithm (step 36) operates to determine the desired level of braking that is being requested by driver through the accelerator and brake pedals. This algorithm then divides this braking request appropriately between regenerative braking and friction braking, as determined by joint interaction of, and/or between, the PCM and BCU, depending on multiple vehicle states not including wheel slip conditions.

If wheel slip is not occurring (step 24), and a wheel slip event flag is not active (step 26), then the requested friction brake torque and/or regenerative brake torque, as determined by step 36, is, or are, applied (step 28). If wheel slip is occurring, then the wheel slip event flag is set active (step 30). Setting of the wheel slip event flag is effective to reduce the regenerative brake torque request (step 32) in an appropriate amount and to add that amount to the friction brake torque request (step 34). Friction brake torque and regenerative brake torque are thereby applied in proper amounts (step 28) that have been reapportioned from the amounts determined by step 36. The wheel slip event flag is deactivated by an end of wheel slip event trigger (step 38). The trigger may be initiated by the occurrence of any one of one or more specific events, such as depression of the accelerator pedal or wheel speed below a certain level. A step 40 monitors for occurrence of the trigger, and once a trigger occurs, the wheel slip event flag is deactivated (step 42).

This terminates further execution of the portion of the strategy that was reducing the regenerative brake torque request and adding said reduction to the friction brake torque request (steps 32 and 34) and returns the regenerative brake and friction brake torque requests to those determined by step 36. As long as the end of wheel slip event trigger has not been activated, reduction of the regenerative brake torque request and addition of said reduction to the friction brake torque request (steps 32 and 34) continues, regardless of wheel slip state.

Figure 2:
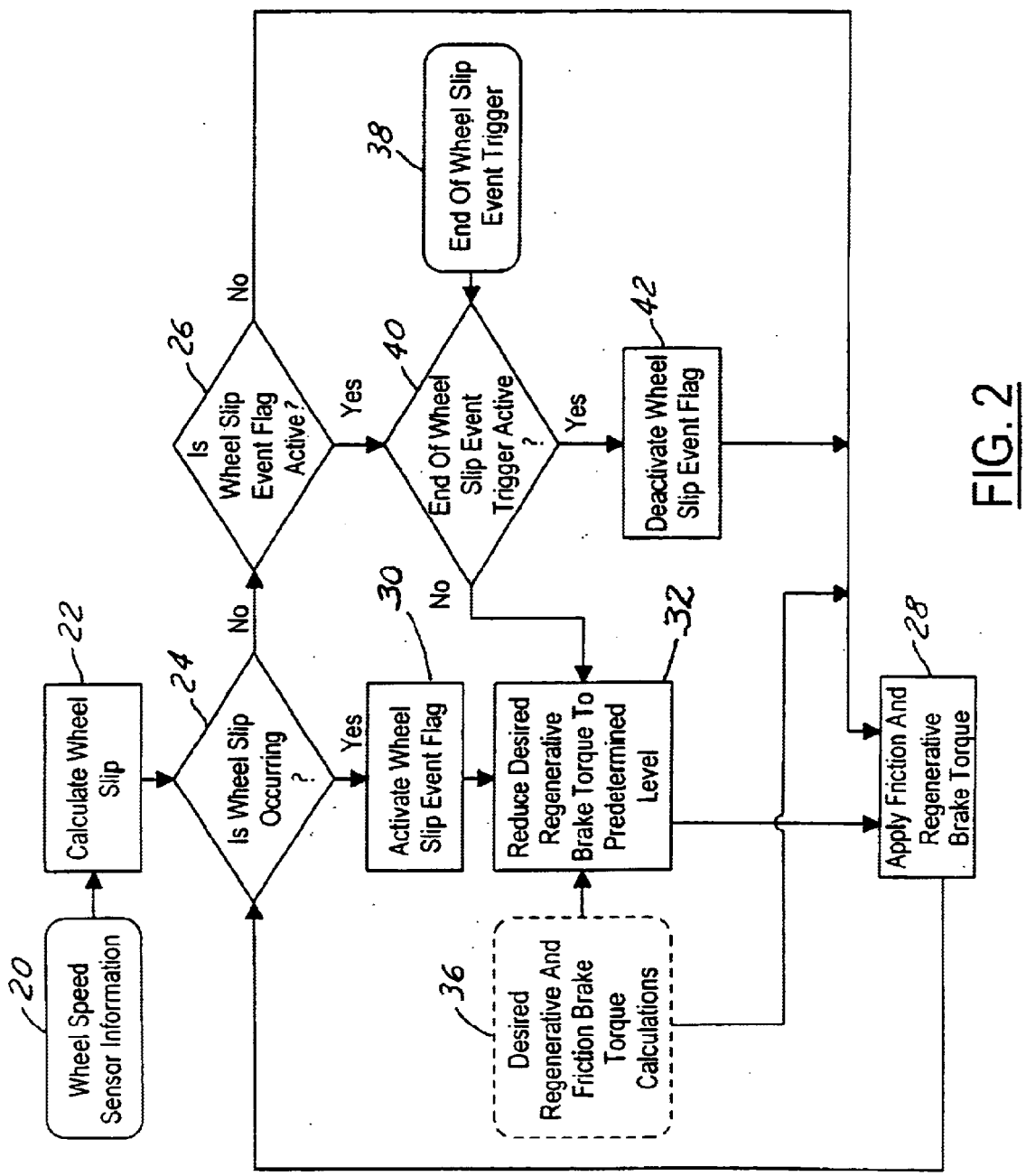
FIG. 2 is a flow diagram representing a second embodiment of control strategy, in accordance with principles of the present invention.

FIG. 2 shows a flow diagram of a strategy that may be considered a modification of the strategy of FIG. 1. It differs from the strategy of FIG. 1 in that step 32 reduces the regenerative brake torque request to a predetermined level without necessarily adjusting the friction brake torque request. This predetermined level for the regenerative torque request is determined based on maximum regeneration levels that will not affect vehicle handling on all driving surfaces under any conditions. Otherwise the strategies are alike. FIGS. 1 and 2 use the same reference numerals to designate the same corresponding steps of the strategies.

Figure 3:
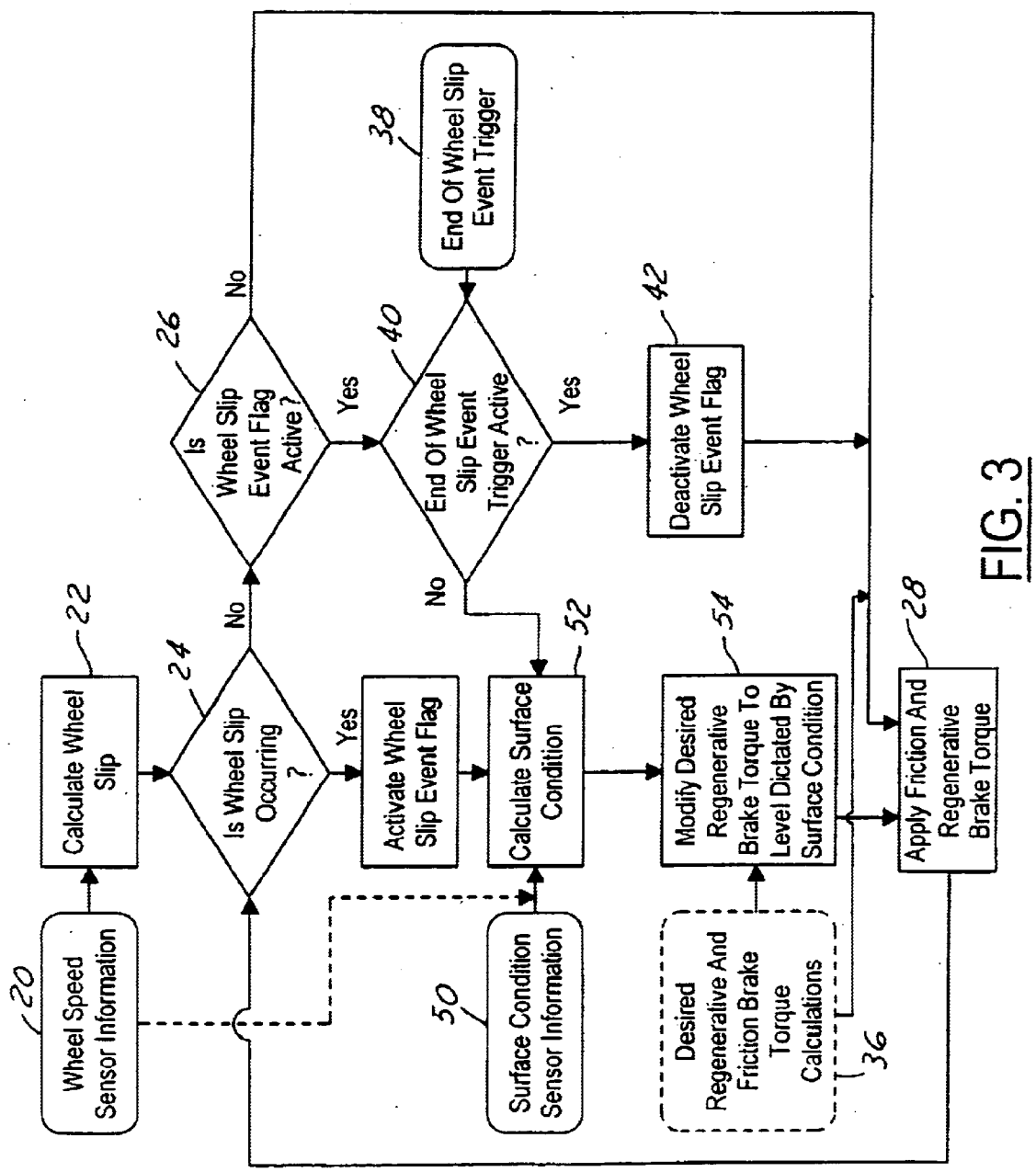
FIG. 3 is a flow diagram representing a third embodiment of control strategy, in accordance with principles of the present invention.

FIG. 3 discloses a third embodiment of strategy where the same reference numerals used in FIGS. 1 and 2 are used to designate the same corresponding steps. The strategy of FIG. 3 differs from the previous two in that once the wheel slip event flag has been activated, the condition of the surface on which the vehicle is traveling is estimated (step 52), for example by estimating its coefficient of friction Mu. Such an estimation can be made by one of the processors processing certain input data, such as wheel speed information 20 and/or surface condition sensor information 50 according to a suitable algorithm. The amount of regenerative braking torque is reduced to a value appropriate to the estimate (step 54). Such a value is one that does not substantially change the handling characteristics of the vehicle. For example, the value may be made progressively lower as the value of Mu decreases. Regenerative brake torque and friction brake torque are then applied in appropriate proportions (step 28).

Figure 4:
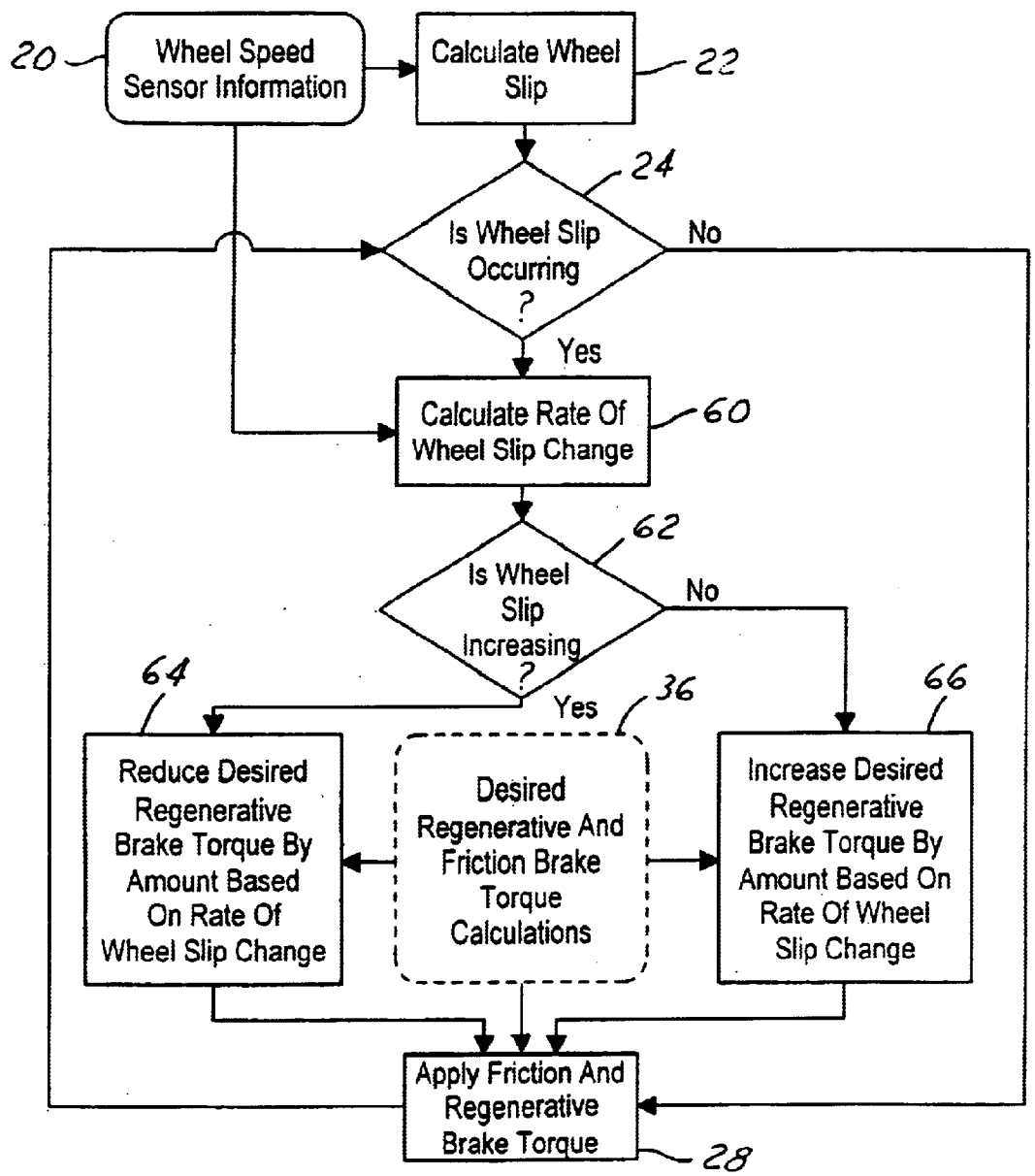
FIG. 4 is a flow diagram representing a fourth embodiment of control strategy, in accordance with principles of the present invention.

The strategy of FIG. 4 is somewhat different from the previous three in that it does not have to involve a wheel slip event flag. Rather, the rate of change of wheel slip is calculated (step 60), and a determination is made as to whether or not wheel slip is increasing (step 62). If wheel slip is increasing (i.e. one or more wheels is or are increasingly locking up), then the regenerative brake torque request from step 36 is decreased by an amount based on the rate of change of wheel slip (step 64). If wheel slip is not increasing, then the regenerative brake torque request is increased by an amount based on the rate of change of wheel slip (step 66). Regenerative brake torque and friction brake torque are applied in appropriate amounts (step 28).

Figure 5:
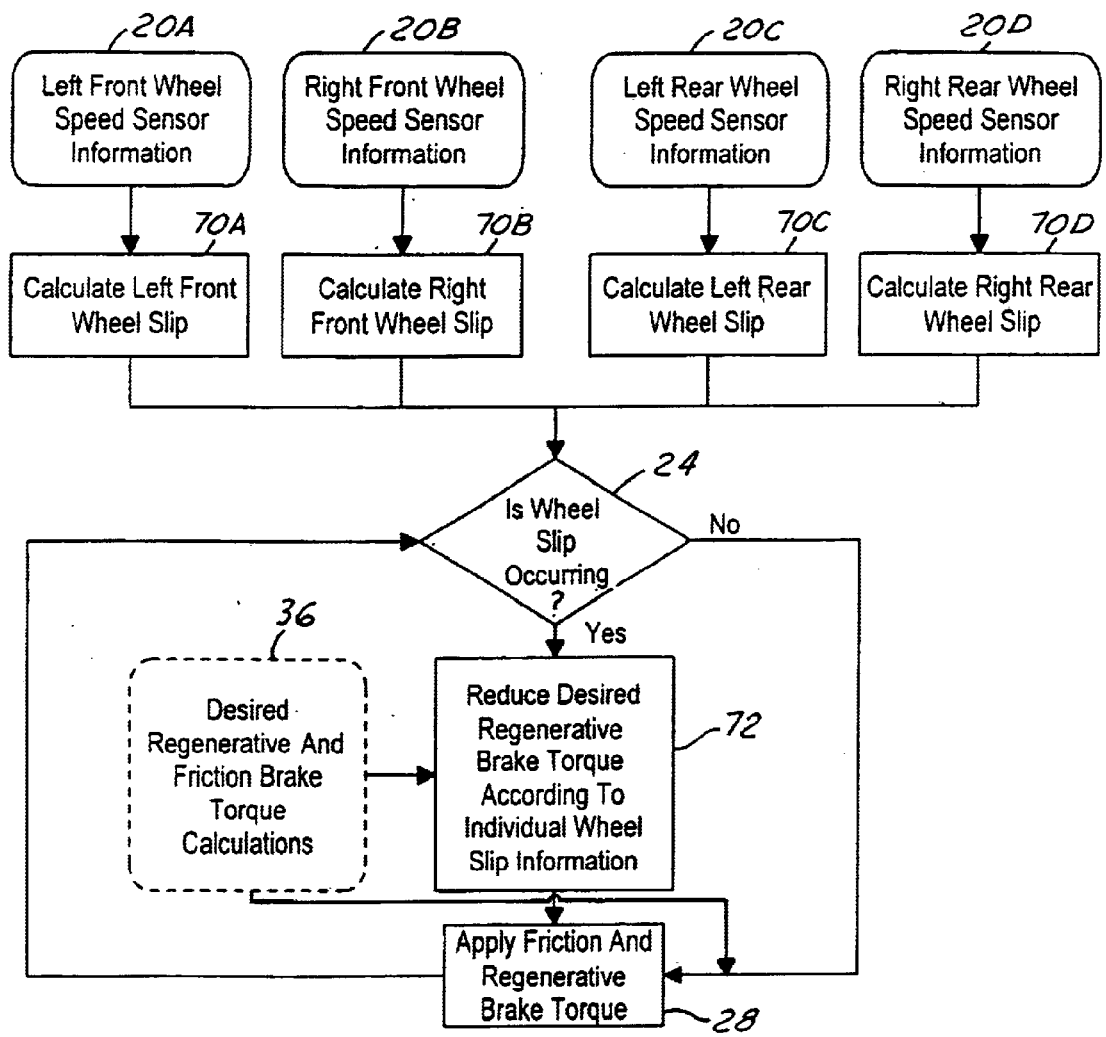
FIG. 5 is a flow diagram representing a fifth embodiment of control strategy, in accordance with principles of the present invention.

FIG. 5 illustrates a control strategy where wheel slip is monitored and calculated on an individual wheel basis. Wheel speed information is obtained from a respective sensor associated with each wheel (steps 20A, 20B, 20C, 20D). Wheel slip is calculated for each wheel (steps 70A, 70B, 70C, 70D). Regenerative brake torque is reduced (step 72) to different levels based on individual wheel slip information and/or particular combinations of individual wheel slip information. For example, it may be decided to reduce regenerative braking torque only if the wheels that are affected by regenerative brake torque (i.e. the driven wheels) are experiencing wheel slip.

While a presently preferred embodiment has been illustrated and described, it is to be appreciated that the invention may be practiced in various forms within the scope of the following claims.

What is claimed is:

1. An electric motor vehicle comprising:
   road-engaging wheels;
   friction brakes for the wheels;
   a powerplant comprising a rotary electric machine that is operatively coupled through a drivetrain to driven ones of the road-engaging wheels and that is capable both of delivering traction torque to the driven wheels and of imposing regenerative braking torque on the driven wheels;
   a throttle request source operated by a throttle that is depressed to accelerate the vehicle; and
   a brake request source operated by a brake pedal that is depressed to brake the vehicle; and
   a processing system for processing data useful in operating both the friction brakes and the electric machine, including data from the throttle request source requesting the electric machine to operate as a generator imposing regenerative braking on the drivetrain simulating compression braking that would be imposed by an internal combustion engine on the drivetrain when the throttle ceases to be depressed and data from the brake request source requesting the electric machine to operate as a generator imposing regenerative braking on the drivetrain when the brake pedal is depressed, and calculating desired regenerative braking torque and desired friction brake torque when braking torque requires both regenerative braking torque and friction brake torque;
   wherein the processing system executes a strategy comprising reducing, but not completely eliminating, the torque that is being applied to the drivetrain as regenerative braking torque when a wheel-condition-initiated triggering event occurs.

* * * * *